(No Model.)
D. R. FRASER.
ROCK OR ORE CRUSHER.
No. 266,804. Patented Oct. 31, 1882.
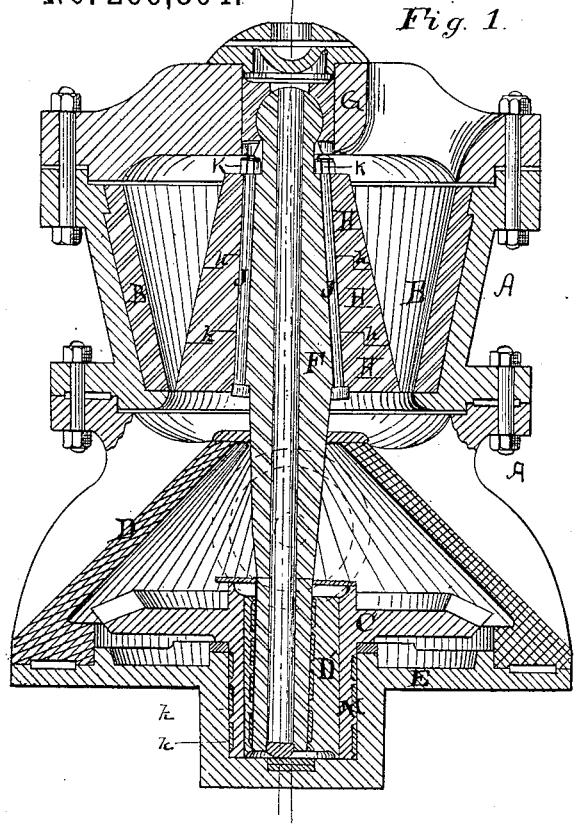
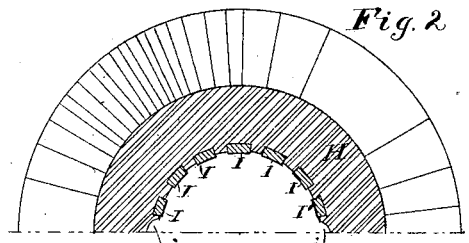
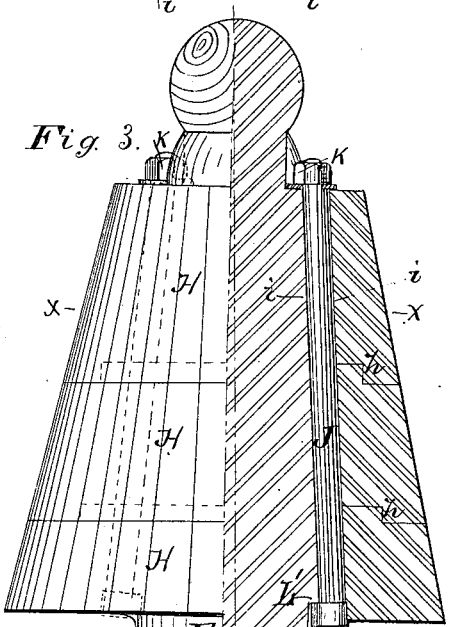
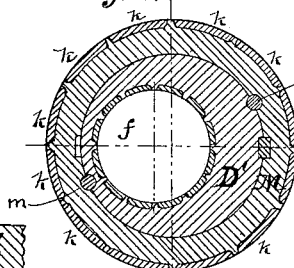
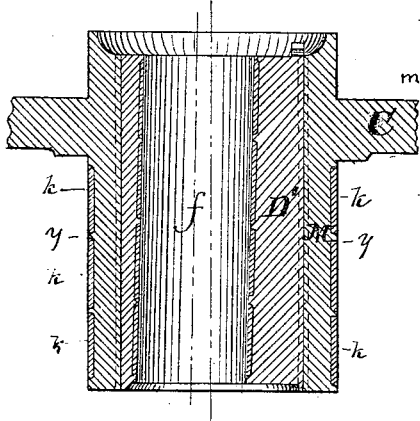
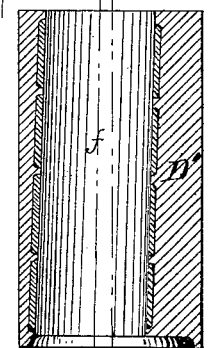
Witnesses:
J. C. Turner
Aug. Jordan
Inventor:
D. R. Fraser
N. PETERS, Photo-Lithographer, Washington, D. C.

UNITED STATES PATENT OFFICE.

DAVID R. FRASER, OF CHICAGO, ILLINOIS.

ROCK OR ORE CRUSHER.

SPECIFICATION forming part of Letters Patent No. 266,804, dated October 31, 1882.

Application filed July 13, 1882. (No model.)

*To all whom it may concern:*

Be it known that I, DAVID R. FRASER, of Chicago, Cook county, in the State of Illinois, have invented certain new and useful Improvements in Rock or Ore Crushers; and I do hereby declare that the following is a full and accurate description of the same.

That others may fully understand my invention, I will particularly describe it, having reference to the accompanying drawings, in which—

Figure 1 is a vertical central section of my machine. Fig. 2 is a transverse section of the crushing-head on line $x\ x$, Fig. 3. Fig. 3 is a half-sectional elevation of the crushing-head. Fig. 4 is a vertical central section of the hub of the bevel driving-wheel. Fig. 5 is a similar sectional view of the spindle-step. Fig. 6 is a transverse section of said spindle-step and driver-hub on line $y\ y$, Fig. 4.

A is the cast-iron frame of the machine, usually made in two or three separable sections for convenience of manufacture. The upper section of the frame A is conical, with the larger end or base upward, and the hard-iron lining-plates B, which constitute the exterior grinding-surface, are placed within said upper section, as shown. The lower section usually contains a shield, D, to protect the gearing C, which is placed on the base-plate E below said shield.

The gyrating spindle F is provided with a spherical head at its upper end, and which is fitted to a corresponding socket in the bridge or cover plate G. At its lower end said spindle is stepped in a socket, caused to rotate about the axis of the driving-wheel C, and thereby said spindle is by a continuous rotary movement carried along the face of the grinding-plates B, crushing the stones in its advance and releasing the fragments when it has passed them; but to make this grinding effective the spindle F must also be armed with hard plates to resist the grinding action of the stone in process of crushing. These arming-plates are the hard-iron rings H H, which are made in series, as shown, and are provided with interlocking portions $h$, whereby they are to a degree self-supporting, and to a corresponding extent the strain upon the spindle is distributed along its length. The spindle is conical and the rings H require to be fitted internally thereto; but the coarse iron which is employed for such grinding-surfaces is exceedingly hard and difficult to cut. I therefore place bars I of soft iron vertically in the mold, so that the iron of the ring is cast around three sides of each bar, and thereby firmly embeds it in the metal of the ring, yet leaving one side exposed, so that it may be readily turned off in the lathe to fit the spindle. The rings H H are further secured to each other and to the spindle by the hook-headed bolts J, which pass down inside the rings H in recesses made for the purpose partly in said rings and partly in the spindle. The hook-heads of the bolts J engage with shoulders L', made on the spindle F at the proper points, and at their upper ends the nuts K bear upon the upper ring, and thus bind said rings together and to the spindle, while the body of each bolt acts as a key to prevent rotation of the ring on said spindle.

The outer grinding-face, B, is conical with its larger end upward, while the grinding-face of the spindle is conical with its smaller end upward. The intervening space is therefore a funnel-shaped annulus, into which the pieces of rock or ore are thrown and crushed again and again as the fragments become smaller and fall toward the lower part of said funnel. Said lower part will therefore encounter a greater number of contacts than the upper part and will be worn away more rapidly. I therefore make the lower ring H smaller in vertical thickness than the one above it, and so on, and the use of such horizontal rings enables me to take off and replace more often that part of the grinding-surface which wears away more rapidly. The grinding-plates B may be constructed and disposed in the same horizontal way and for the same useful reason. The step of the spindle F is a socket in a removable thimble, D', which is inserted in the hub M of the driving gear-wheel C. The step-socket $f$ is made more or less eccentric to the axis of the thimble, so that as the wheel and thimble are rotated the foot of the spindle is carried around with it, and thus the grinding-face of the rings H are caused to gyrate.

To compel revolution of the thimble D' with the hub M, one or more keys, m, may be inserted, and other key-seats may be provided, so that the position of the thimble in the hub may be changed by partial rotation to equalize the wear by exposing different surfaces from time to time, and thus increasing or prolonging the endurance of the machine. The use of the socket-thimble D' enables me to increase or diminish the eccentricity of the gyration, as may be desirable, by removing one thimble and replacing it with another having the socket $f$ more or less eccentric, as may be required.

The wearing-surfaces of the socket $f$ and of the hub may be armed with anti-friction metal, if desired. The exterior face or bearing-surface of the hub M is provided with pits or cells $k$, filled with Babbitt or other anti-friction metal.

Having described my invention, what I claim as new is—

1. A crusher acting by rotary motion in a horizontal plane, armed with horizontal removable crushing-rings provided with cylindric overlapping portions $h$, whereby strains transverse to the axis on one ring are distributed to the adjoining rings, substantially as described.

2. The gyrating spindle F, combined with the hard-iron horizontal rings H, of varying width and arranged in an increasing order from the bottom, to constitute a crushing-head wherein the parts most subject to wear may be replaced, as set forth.

3. The conical spindle F, provided with one or more shoulders, L, and the horizontal rings H, fitted to said spindle, and said rings and spindle jointly provided with recesses $i$ to receive the tie-bolts J, combined with said tie-bolts J, the heads whereof engage with said shoulders L, and the nuts K whereof engage with uppermost of said rings, to tie the whole together and act as keys to prevent rotation, as set forth.

4. The driving-wheel C and its hollow hub M, combined with the thimble D', provided with the eccentric socket $f$, and means whereby said thimble may be locked to said hub, whereby it may be partly rotated in said hub from time to time to vary the location of the wearing-surfaces, as set forth.

5. The bevel-driver C, provided with a hollow hub, M, and a socketed base-plate, E, combined with the thimbles D', provided with the sockets $f$, of different eccentricities, and the spindle F, stepped therein, whereby the eccentricity or throw of said spindle may be changed by substituting thimbles of different eccentricities, as set forth.

6. The wheel C, having bearing-hub M, provided with cells $k$ and anti-friction metal on its exterior surface.

DAVID R. FRASER.

Witnesses:
THOMAS T. BAKER,
JAMES RENSHAW.